United States Patent [19]
Han

[11] Patent Number: 6,030,528
[45] Date of Patent: Feb. 29, 2000

[54] WASTE WATER TREATMENT PLANT FOR REMOVING NITROGEN AND PHOSPHORUS

[76] Inventor: Sang-Bae Han, 18-702, Asian Game Village Apt., 86(21/8), Chamshil-Dong, Songpa-Gu Seoul 138-020, Rep. of Korea

[21] Appl. No.: 09/102,694

[22] Filed: Jun. 22, 1998

[30] Foreign Application Priority Data

Jun. 23, 1997 [KR] Rep. of Korea ............ 97-26481

[51] Int. Cl.[7] .................................................. C02F 9/00
[52] U.S. Cl. ..................... 210/202; 210/138; 210/252
[58] Field of Search ............................ 210/138, 143, 210/201, 202, 205, 252

[56] References Cited

U.S. PATENT DOCUMENTS

| | | | |
|---|---|---|---|
| 4,966,705 | 10/1990 | Jamieson et al. | 210/605 |
| 5,071,547 | 12/1991 | Cazer et al. | 210/198.2 |
| 5,354,471 | 10/1994 | Timpany et al. | 210/201 |

OTHER PUBLICATIONS

Design of Municipal Wastewater Treatment Plants—vol. I: Chapters 1–12, pp. 601–608 (WEF Manual of Practice No. 8), Dec. 1992.

Design of Municipal Wastewater Treatment Plants—vol. II: Chapters 13–20, pp. 928–933 (WEF Manual of Practice No. 8) 1992.

Two Dong Myeong Engineering Consultants design drawings, 1997. 5 [P & ID (1) and P & ID (2)].

*Primary Examiner*—David A. Simmons
*Assistant Examiner*—Frank M. Lawrence
*Attorney, Agent, or Firm*—McCormick, Paulding & Huber LLP

[57] ABSTRACT

A waste water treatment plant for removing nitrogen and phosphorus is provided. The plant is operable by flow path change and intermittent aeration by the combination of at least two sets if intra-clarifier type oxidation ditches, external-clarifier type oxidation ditches or activated sludge processes.

6 Claims, 12 Drawing Sheets

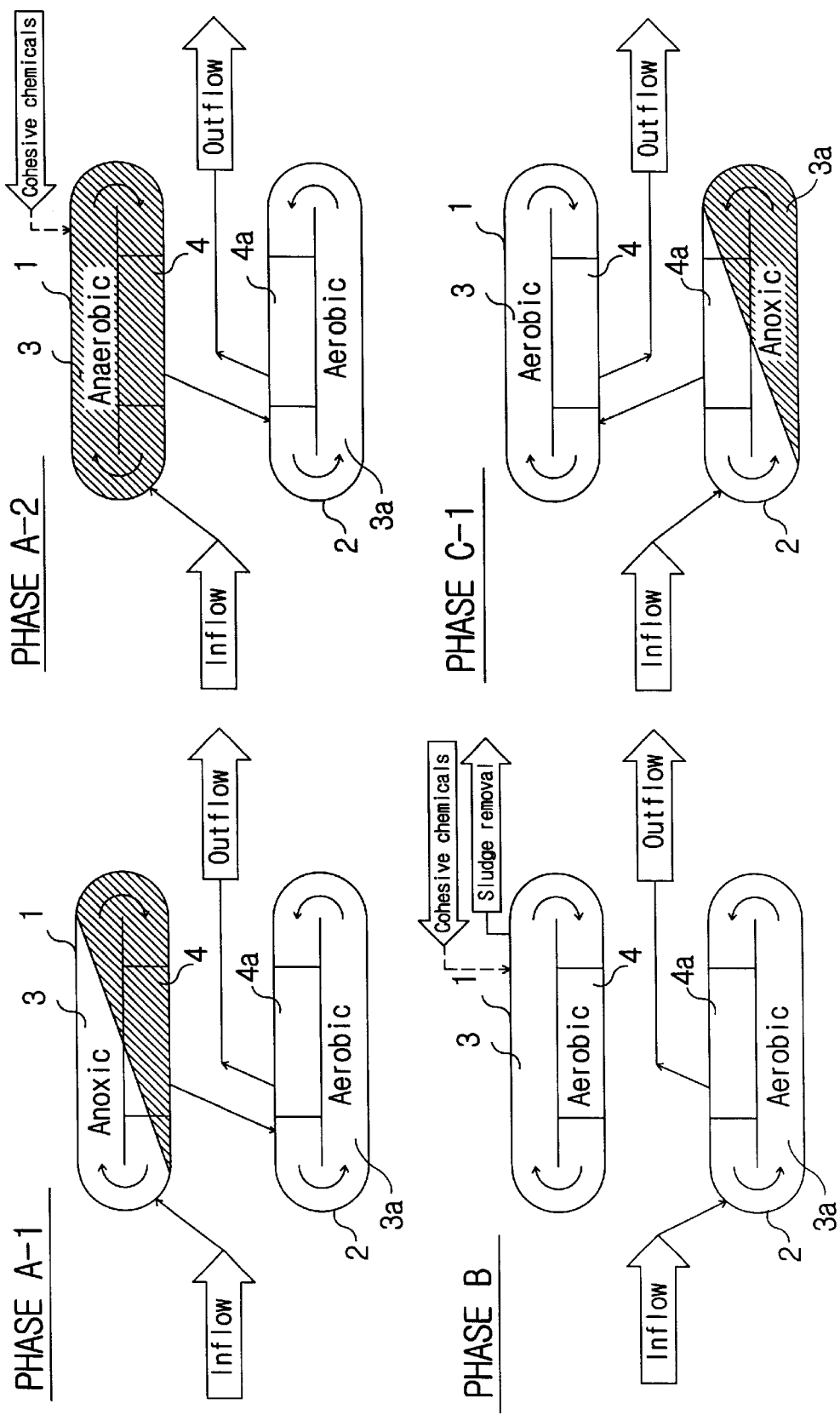

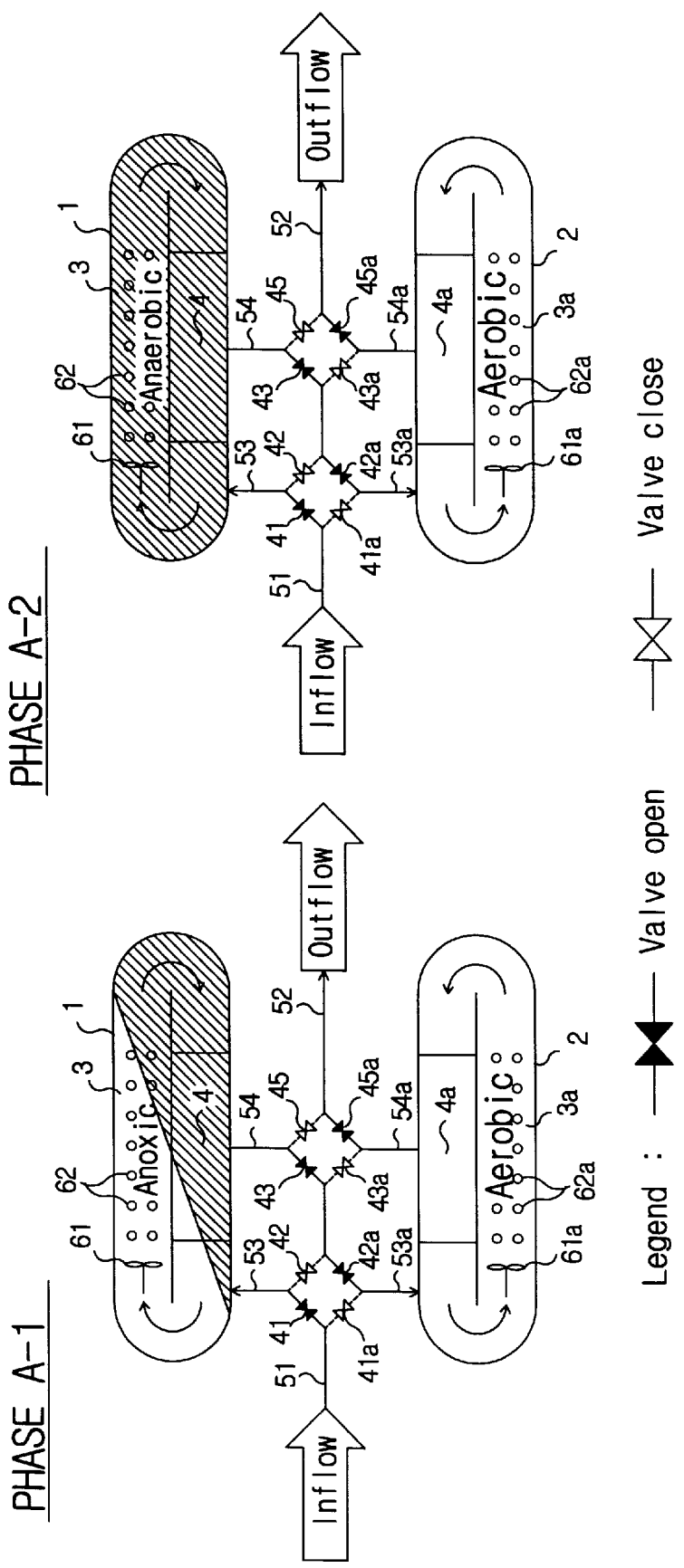

PHASE D

PHASE C-2

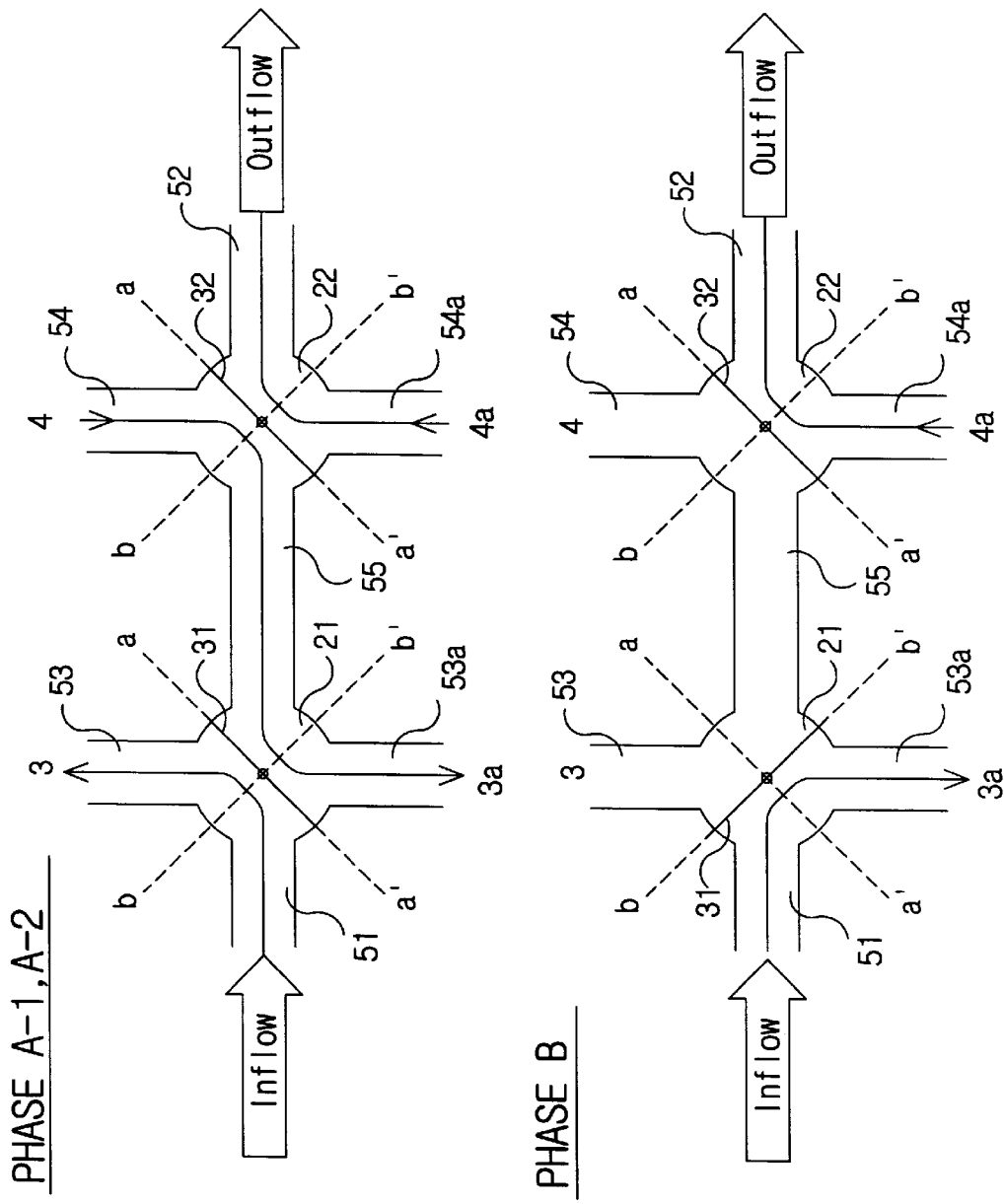

PHASE C-1, C-2

PHASE D

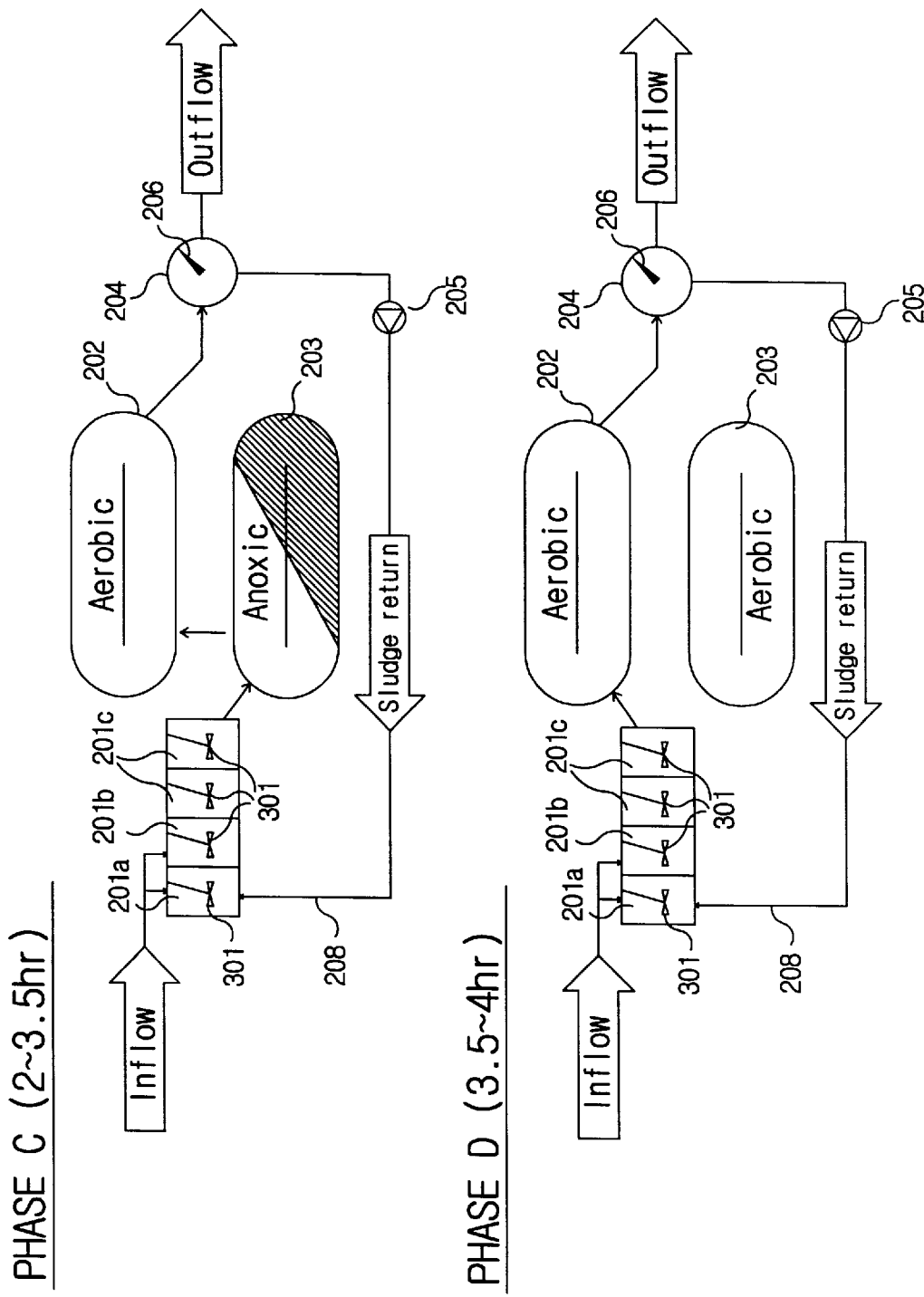

PHASE C (2~3.5hr)

PHASE D (3.5~4hr)

WASTE WATER TREATMENT PLANT FOR REMOVING NITROGEN AND PHOSPHORUS

BACKGROUND OF THE INVENTION

1. Field of the Invention

The present invention relates to an apparatus for removing nitrogen and phosphorus in a waste water treatment plant, and more particularly, to an apparatus for removing nitrogen and phosphorus by combining at least two sets of unit systems constructed by incorporating a clarifier into an oxidation ditch and operating the unit systems by a method of intermittent aeration and change of flow path.

2. Description of the Related Art

To remove nitrogen and phosphorus biologically in a waste water treatment plant, an anoxic process in which free oxygen is not supplied, an anaerobic process, and an aerobic process in which oxygen is supplied, are carried out. In an aerobic reaction basin, organic nitrogen and ammoniacal nitrogen are oxidized into nitrate. In an anoxic reaction basin, a denitrification process in which the nitrate is reduced into nitrogen gas to then be released to the air is carried out. In an anaerobic reaction basin, release of phosphorus is taken from activated sludge. Microorganisms take up the released phosphorus components luxuriously in the aerobic reaction basin. The microorganisms having done the luxury uptake are removed by the waste sludge, thereby finally nitrogen and phosphorus are removed.

In a conventional method for removing nitrogen and phosphorus, anaerobic basins, anoxic basins and aerobic basins are separately installed with a constant capacity. Thus, it is not possible to cope with changes in quality and amount of influent with flexibility. Also, methanol must be injected into the plant as an electron donor form denitrification, or water in a nitrification basin must be recirculated to the previous phase, that is a denitrification basin, to utilize organisms contained in the waste water. For injection of methanol it costs a lot for chemicals, and for utilizing the organisms, the costs for installation of pump, electricity, maintenance and management are in need, since the recirculation flow is about 4 times of the influent.

To overcome such problems, methods of intermittent aeration and flow path change have been proposed. As typical conventional arts employing the intermittent aeration and flow path change, there is a so called Bio Denipho process or a Phased Isolation Ditch (PID) process.

FIGS. 7A and 7B show a conventional PID process form removing nitrogen and phosphorus, illustrating changes in inflow and outflow directions, that is, flow path changes, in a aerated or anerated state for the respective phases A through D.

The overall configuration of an equipment for the PID process will be described in the order of progress hereinbelow. In view of the progress of the influent, the equipment is constructed by a preliminary denitrification basin 201a, a selection basin 201b, an aneropic basin 201c, at least two sets of oxidation ditches 202 and 203 each having an aerator and a mixer, and a clarifier 204 having a sludge collector 206. Also, there are equipped with a sludge return pump 205 for returning the sludge from the clarifier 204 to the preliminary denitrification basin 201a, and a sludge return pipe 208.

The function of the anaerobic basin 201c is to mix incoming raw waste water with the sludge returned from the clarifier 204 by the sludge return pump 205 and to release the phosphorus from the sludge while an anaerobic state is maintained. If chemically combined oxygen such as nitrate ($NO_3$) or nitrite ($NO_2$) exists, the release of phosphorus from the sludge hardly occurs. Thus, in the previous phase of the anaerobic basin 201c, free oxygen or nitrate contained in the raw waste water or sludge returned is first removed from the preliminary denitrification basin 201a and the selection basin 201b. Otherwise, the anaerobic basin 201c shall be constructed with at least two sets of basins in combination to prevent short circuit, and a mixer 301 is installed in each reaction basin.

The clarifier 204 is an external clarifier independently installed outside the oxidation ditches 202 and 203, and the sludge collector 206, the sludge return pump 205 and return pipe 208 are additionally installed therein. Here, the sludge return flow must be more than the total amount of the inflow.

As described above, in view of facility, maintenance and management, the PID process requires installation costs, electricity and facility management costs due to the construction of the preliminary denitrification basin 201a, the selection basin 201b, the anaerobic basin 201c and the clarifier 204, and the installation and operation of the sludge return pump 205, the sludge collector 206 and the mixer 301.

Also, in view of a processing efficiency, in the PID process, since a change between phases is not fast and is not clear, the processing efficiency may be lowered. As the activated sludge having a reduced content of phosphorus by the release of phosphorus in an anaerobic state, is converted to be in an aerobic state so that the microorganisms are activated, These activated microorganisms take up phosphorus luxuriously. However, in the PID process, the sludge passed through the release of phosphorus in the anaerobic basin 201c is induced to an anoxic state in phases A and C, not to an aerobic state. Thus, the microorganisms may not be sufficiently activated, and this lowers the uptake efficiency of phosphorus.

During a denitrification process, to reduce nitrogen oxide, organisms are required as electron donors as much as possible. However, in the PID process, the sludge on which a large amount of organisms required for denitrification are adsorbed is continuously release from the oxidation ditch in which denitrification is carried out in the anoxic state, thus the sludge is induced to the oxidation ditch where a nitrification process in which a large amount of the incoming organisms acts unfavorably, is carried out. Hence, much more time is required for the nitrification process and the denitrification efficiency of the anoxic oxidation ditch is lowered.

In the phase A in PID process, the same amount of sludge as that of inflow is continuously released from the first oxidation ditch 202 where denitrification is carried out, then flows into the second oxidation ditch 203 where nitrification is carried out. Thus, the organisms adsorbed in the sludge are washed away from the first oxidation ditch 202, which is unfavorable to the denitrification. Then, the organisms are introduced to the second oxidation ditch 203 where nitrification is carried out to act unfavorably on the nitrification.

These situations also occur in the phase C in which the flow path is changed and denitrification is carried out in the second oxidation ditch 203. the oxidation ditch constituting the unit system including the clarifier from which the sludge returned is drawn out. In other words, the sludge returned is not flown into the oxidation ditch of the adjacent unit system. Also, according to the present invention, the flow paths of the waste water can be changed and means for controlling the flow paths is provided.

BRIEF DESCRIPTION OF THE DRAWINGS

The above objectives and advantages of the present invention will become more apparent by describing, in detail, a preferred embodiment thereof with reference to the attached drawings in which:

FIGS. 1A and 1B are flow diagrams of a method for removing nitrogen and phosphorus according to the present invention;

FIGS. 3A to 3C are flow diagrams illustrating a method for operating the apparatus for removing nitrogen and phosphorus according to the first embodiment of the present invention;

FIGS. 5A and 5B are flow diagrams illustrating a method for operating the apparatus for removing nitrogen and phosphorus according to the second embodiment of the present invention;

FIGS. 7A and 7B are flow diagrams of a method according to a conventional apparatus and method for removing nitrogen and phosphorus.

DESCRIPTION OF THE PREFERRED EMBODIMENTS

The present invention will now be described in detail with reference to the accompanying drawings.

Figure 1B:
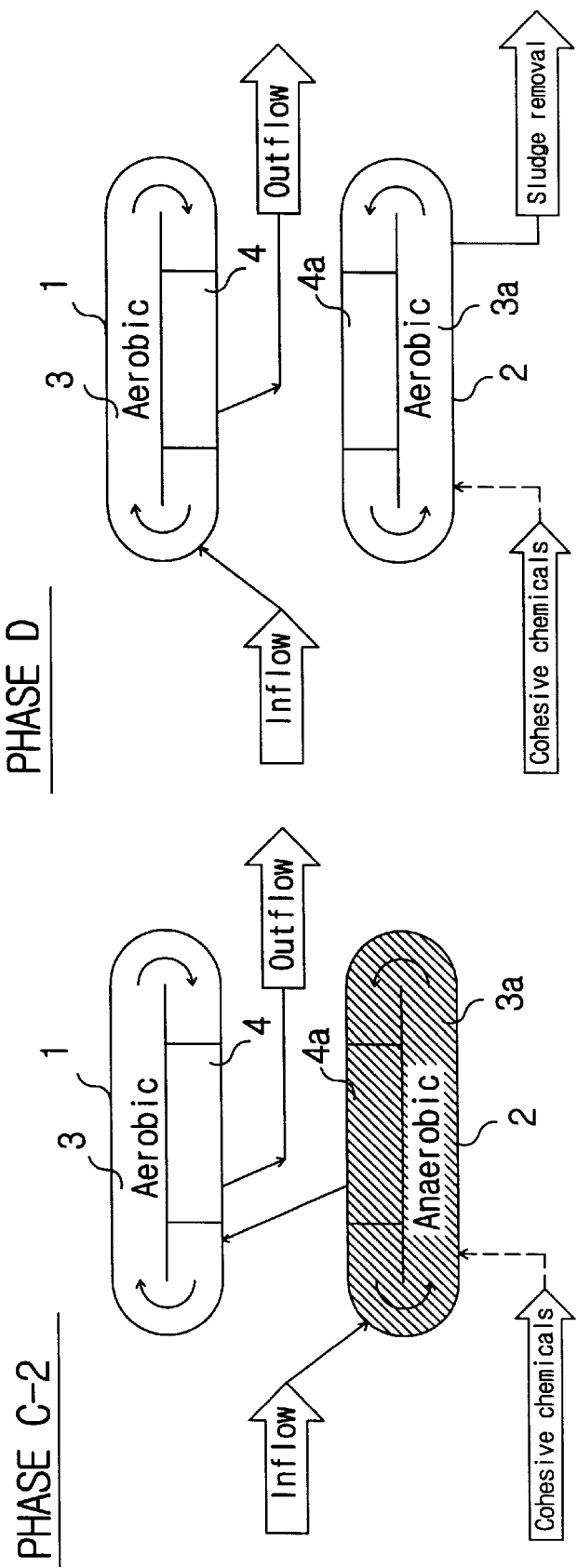

FIGS. 1A and 1B are flow diagrams of a method for removing nitrogen and phosphorus according to the present invention, which illustrating that nitrogen and phosphorus are removed by flow path change and intermittent aeration using a waste water treatment apparatus comprising a first and second intra-clarifier type oxidation ditches 1 and 2 which form unit systems in which first and second clarifiers 4 and 4a are incorporated into oxidation ditches 3 and 3a with an aerator and a mixer (not shown).

<Phase A-1 shown in FIG. 1A>

In the phase A-1 shown in FIG. 1A denitrification, decomposition of organisms and nitrification occur in combination. The denitrification occurs in the first intra-clarifier type oxidation ditch 1, and the nitrification occurs in the second intra-clarifier type oxidation ditch 2. In view of flow path of waste water, the influent is introduced to the first intra-clarifier type oxidation ditch 1, and the effluent from the first intra-clarifier type oxidation ditch 1 is released as treated water through the second intra-clarifier type oxidation ditch 2.

Here, in the first oxidation ditch 3, the operation of the aerator is interrupted and only the mixer is operated in an anoxic state. Also the denitrification occurs by organisms contained in the influent, that is, the nitrogen oxide is reduced into a nitrogen gas, i.e., organic nitrogen. At the same time, in the second oxidation ditch 3a, while the aerator is operated and an aerobic state is maintained, the nitrification together with the decomposition of organisms occurs.

Figure 7B:
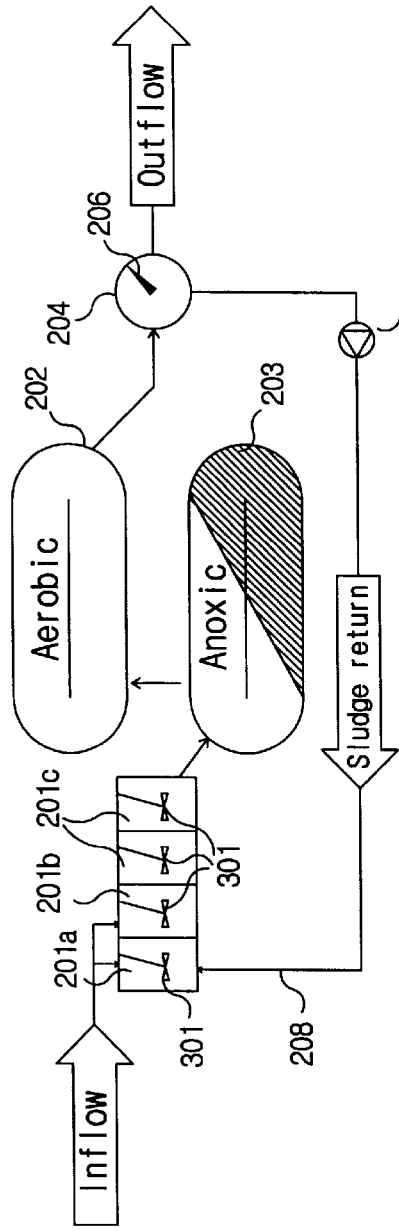
Figure 7B:
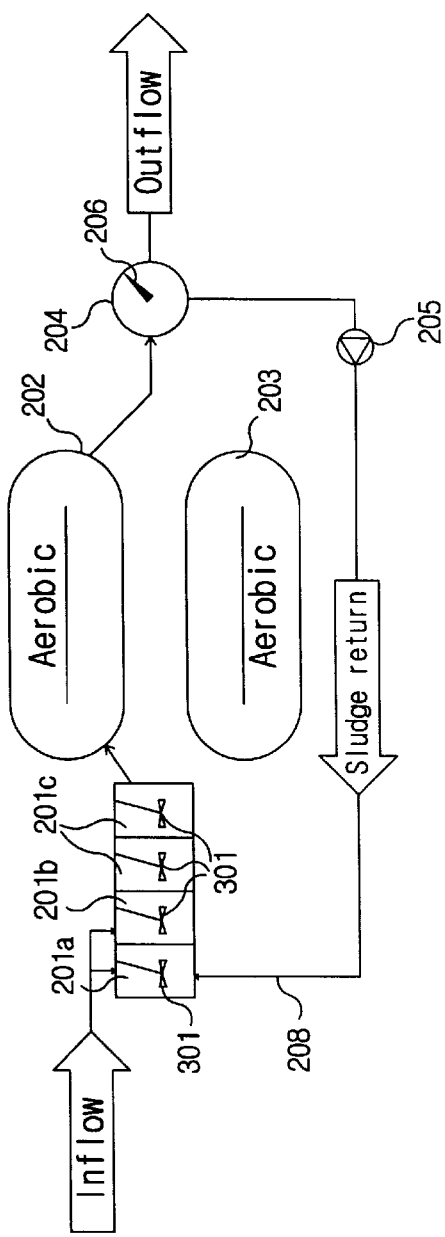

The phase A-1 corresponds to the phase A of the PID process shown in FIGS. 7A and 7B. In the PID process, the liquid mixed with the sludge flows in to be introduced to the second oxidation ditch 203. However, in the present invention, since the effluent from the first intra-clarifier type oxidation ditch 1 is treated water from which the sludge is settled down in the first clarifier 1, the influent from the first clarifier 4 to the second oxidation ditch 3a does not contain the sludge. Therefore, in the present invention, since the sludge on which organisms are adsorbed is not released from the first intra-clarifier type oxidation ditch 1 of the phase A-1 in which denitrification occurs, the organisms are not released from the first oxidation ditch 3 corresponding to the denitrification basin. Thus, the organisms as electron donors are not washed away in the first oxidation ditch 3.

<Phase A-2 shown in FIG.1A>

In the phase A-2 shown in FIG. 1A, the release of phosphorus is mainly carried out. Since the flow path and the operation process of an aerator are the same as those in the phase A-1, the phase A-2 seems indistinguishable for the phase A-1 but it is distinguishable concerning its actual reactions. In other words, in the first oxidation ditch 3 of the phase A-1, nitrogen oxide is reduced, and in the first oxidation ditch 3 of the phase A-2 the phosphorus is released from the sludge. For effective release of phosphorus in the first oxidation ditch 3 of the phase A-2, the first intra-clarifier type oxidation ditch 1 shall be in a perfectly anaerobic state in which even bonded oxygen in the form of oxide such as nitrogen oxide is not present. The removal of the nitrogen oxide is fulfilled in the first oxidation ditch 3 of the phase A-1.

In the phase A-2, the directions of influent and effluent and the combination of aerated and anaerated states are the same as those in the phase A-1, but the release of phosphorus from sludge is carried out. And the operation time of the first intra-clarifier type oxidation ditch 1 of the phase A-1 in which the nitrogen oxide is removed in an anoxic state is just prolonged under the perfectly anaerobic condition in which even nitrogen oxide is not present. Therefore, according to the present invention, the function of the anaerobic basin 201c in the conventional PID process can be substituted just by the phase A-2 which is different from the phase A-1 in which the operation time is prolonged, without installing an additional dephosphorization equipment.

In the present invention, the first and second intra-clarifier type oxidation ditches 1 and 2 employ the first and second clarifiers 4 and 4a which are integrally formed with the first and second oxidation ditches 3 and 3a respectively. Thus, unlike the PID process in which at least two oxidation ditches and a series of external clarifiers are combined, since sludge is circulated within the first intra-clarifier type oxidation ditch 1 in which the first clarifier 4 is incorporated into the first oxidation ditch 3, the sludge containing free oxygen and nitrogen oxide is not introduced from the second intra-clarifier type oxidation ditch 2 held in an aerobic state to the first intra-clarifier type oxidation ditch 1. Therefore, in the present invention, in contrast to the PID process shown in FIGS. 7A and 7B the first intra-clarifier type oxidation ditch 1 can maintain a perfectly anaerobic state without passing through aerobic basins 201a through 201c in a sludge inflow line. In the first intra-clarifier type oxidation ditch 1 of the phase A-1 in which sludge returned containing free oxygen or bonded oxygen is not introduced from an aerobic basin, i.e., the second oxidation ditch 3a, even nitrogen oxide is completely exhausted by organisms contained in the raw waste influent in an anaerated state.

In the phase A-2, the phosphorus is released by microorganisms present in sludge in the first intra-clarifier type oxidation ditch 1 held in an anaerobic state. The bled-back phosphorus is bonded with ferrous slats or calcium ions contained in the waste water to then be removed as an insoluble compound. Also, if necessary, some cohesive chemicals such as ferrous slats are injected to the phosphorus released in an anaerobic state to solidify the same to be insoluble so that it is drawn out with excess sludge for removal. While the phosphorus is released form the sludge in the first intra-clarifier type oxidation ditch 1 of the phase A-2, the second intra-clarifier type oxidation ditch 2 is operated in an aerobic state, and decomposition of organisms and nitrification are continuously carried out.

<Phase B shown in FIG. 1A>

In the phase B shown in FIG. 1A, the anaerobic state of the first intra-clarifier type oxidation ditch 1 in phase A-2 is converted into an aerobic state. At the same time, since the first intra-clarifier type oxidation ditch 1 is operated in a no-load state in which the influent is not flown in due to changes in the flow path, only oxygen necessary of nitrification of the sludge is consumed, that is, only a small amount of oxygen is consumed. Thus, in this phase, the interior of the first intra-clarifier type oxidation ditch 1 is rapidly changed into an aerobic state. The sludge with which the phosphorus is released in an anaerobic state takes up more phosphorus luxuriously than the prior state. Then, the phosphorus concentrated sludge is removed, thereby finally removing phosphorus present in liquid.

If the first intra-clarifier type oxidation ditch 1 is converted again into the aerobic state in the phase B, the microorganisms constituting sludge take up the released phosphorus. Excess phosphorus after the luxury uptake coheres to be insoluble by injecting ferrous slats or aluminum slats to then be removed. Then, the concentration of phosphorus in the first intra-clarifier type oxidation ditch 1 decreases to reach an oligotrophic state, thereby achieving dephosphorization. The excess sludge is mainly drawn out from the first intra-clarifier type oxidation ditch 1 in this phase to then be removed.

In the phase B, the flow paths of the phases A-1 and A-2 are changed so that the raw waste influent is directly flown in into the second intra-clarifier type oxidation ditch 2, that is, into the second oxidation ditch 3*a*, without passing through the first intra-clarifier type oxidation ditch 1, and passes through the second clarifier 4*a* to then be flown out as treated water. While the second oxidation ditch 3*a*, is continuously maintained in the aerobic state, the organisms are decomposed and nitrification is continuously carried out.

<Phase C-1 shown in FIG. 1A>

The phase C-1 shown in FIG. 1A in which denitrification and nitrification are carried out is the same as the phase A-1 in types of reactions, with the exception of functions and flow paths of the first and second intra-clarifier type oxidation ditches 1 and 2 being interchanged. In other words, in the phase C-1, the flow paths are changed so that the raw waste water is flown in into the second intra-clarifier type oxidation ditch 2 having accumulated nitrogen oxide constantly and operated in the aerobic state in the phases A-1, A-2 and B. As the aerator stops operating, the second intra-clarifier type oxidation ditch 2 is operated in an anoxic state to carry out denitrification. At the same time, the first intra-clarifier type oxidation ditch 1 is converted into an aerobic state by the actuation of the aerator, so that the decomposition of organisms and nitrification are continuously carried out.

As shown in FIG. 1A, the progress in the phase A-1 is as follows:

inflow of raw waste water—first intra-clarifier type oxidation ditch 1 (first oxidation ditch 3—first clarifier 4)—second intra-clarifier type oxidation ditch 2 (second oxidation ditch 3*a*—second clarifier 4*a*)—outflow of treated water.

In the phase C-1, the flow path of the phase A-1 is changed as follows: inflow of raw waste water—the second intra-clarifier type oxidation ditch 2 (second oxidation ditch 3*a*—second clarifier 4*a*)—first intra-clarifier type oxidation ditch 1 (first oxidation ditch 3–first clarifier 4)—outflow of treated water.

In other words, changes are made so that the denitrification occurring in the first intra-clarifier type oxidation ditch 1 of the phase A-1 occurs in the second intra-clarifier type oxidation ditch 2 in the phase C-1, and the nitrification occurring in the second intra-clarifier type oxidation ditch 2 of the phase A-1 occurs in the first intra-clarifier type oxidation ditch 1 in the phase C-1. The types of the reactions taking place in the phase C-1 are the same as those in the phase A-1.

<Phase C-2 shown in FIG. 1B>

The phase C-2 in which an anaerobic reaction where release of phosphorus from sludge occurs, nitrification and decomposition of organisms are carried out is the same as the phase C-1 in flow paths and combination of aerated and anaerated states, and is the same as the phase A-2 in types of the reactions taking place therein. In other words, while decomposition of organisms and nitrification are continuously carried out in the first intra-clarifier type oxidation ditch 1, in the phase C-2, the second intra-clarifier type oxidation ditch 2 is converted into a perfectly anaerobic state in which nitrogen oxide is not present, thereby resulting in the phosphorus release from sludge. The phase C-2 is the same as the phase A-2 in treatment procedures, with the exception of the flow path of influent and effluent and functions of the first and second intra-clarifier type oxidation ditches 1 and 2 being interchanged.

In other words, the types of the reactions of the first intra-clarifier type oxidation ditch 1 in the phase C-2 are the same as those of the second intra-clarifier type oxidation ditch 2 in the phase A-2, and the types of the reactions of the second intra-clarifier type oxidation ditch 2 in the phase C-2 are the same as those of the first intra-clarifier type oxidation ditch 1 in the phase A-2. In this phase, the process which can replace the function of the anaerobic basin in the conventional PID process is carried out.

<Phase D shown in FIG. 1B>

The phase D is also the same as the phase B concerning the types of reactions, with the exception of the flow paths and the types of the reactions of the first and second oxidation ditches 3 and 3*a* being interchanged. In other words, the first intra-clarifier type oxidation ditch 1 is operated in an aerobic state to allow inflow and outflow, and the second intra-clarifier type oxidation ditch 2 is operated in a no-load state, without any flow and organisms.

As shown in FIG. 1B, in contrast with the phase B in which the flow is progressed in series as: inflow of raw waste water—second intra-clarifier type oxidation ditch 2 (second oxidation ditch 3*a*—second clarifier 4*a*)—outflow of treated water, the flow path in the phase D is changed into: inflow of raw waste water—first intra-clarifier type oxidation ditch 1 (first oxidation ditch 3—first clarifier 4)—outflow of treated water. The reactions in the phase D are the same as those in the phase B, with the exception of the types of the reactions of the first and second intra-clarifier type oxidation ditch 1 and 2 changed with those in the phase B.

In the phases A-1 through D, the aerobic, anoxic and anaerobic states or the extent of progress of nitrification and denitrification can be estimated by measuring oxidation/reduction potential (ORP), hydrogen ion concentration (pH), dissolved oxygen concentration (DO) or elapsed reaction time by installing a sensor in the first and second oxidation ditches 3 and 3a. Therefore, the gate and valve necessary for switching phases or the aerator are operated in engagement with a timer, ORP controller, pH controller or DO controller, thereby automatically switching the phase and facilitating the operation of the treatment plant.

The respective phases described above can be summarized in the following table 1.

TABLE 1

Reaction in each phase and formation of flow path (FIGS. 1A and 1B)

| Phase | First intra-clarifier type oxidation ditch 1 (Kinds of reactions) | Second intra-clarifier type oxidation ditch 2 | Formation of flow path | Relevant phase in PID process |
|---|---|---|---|---|
| A-1 | -Inflow of raw waste water<br>-Anoxic state<br>-Denitrification<br>-Recirculation of sludge | -Outflow of treated water<br>-Aerobic state<br>-Decomposition of organisms (Nitrification)<br>-Recirculation of sludge | Inflow of raw waste water → first oxidation ditch 3 → first clarifier 4 → second oxidation ditch 3a → second clarifier 4a → outflow of treated water | Phase A |
| A-2 | -Inflow of raw waste water<br>-Anaerobic state<br>-Release of phosphorus<br>-Recirculation of sludge | -Outflow of treated water<br>-Aerobic state<br>-Decomposition of organisms (Nitrification)<br>-Recirculation of sludge | Same as that in phase A-1 | Capable of replacing anaerobic state and facilities of PID |
| B | -No load (without inflow and outflow)<br>-Aerobic state<br>-Luxury uptake of phosphorus<br>-Recirculation of sludge | -Inflow of raw water and outflow of treated water<br>-Aerobic state<br>-Decomposition of organisms (nitrification)<br>-Recirculation of sludge | Inflow of raw water → Second oxidation ditch (3a → Second clarifier (4a) → outflow of treated water | Phase B |
| C-1 | -Outflow of treated water<br>-Aerobic state<br>-Decomposition of organisms (Nitrification)<br>-Recirculation of sludge<br>-Same reactions as those of second intra-clarifier type oxidation ditch 2 in phase A-1 | -Inflow of raw water<br>-Anoxic state<br>-Denitrification-Recirculation of sludge<br>-Same reactions as those of first intra-clarifier type oxidation ditch 1 in phase A-1 | Inflow of raw water → second oxidation ditch (3) → second clarifier (4a) → first oxidation ditch (3) → first clarifier (4) → outflow of treated water | Phase C |
| C-2 | -Outflow of treated water<br>-Aerobic state<br>-Decomposition of organisms (Nitrication)<br>-Recirculation of sludge<br>-Same reactions as those of second intra-clarifier type oxidation ditch 2 in phase A-2 | -Inflow of raw water<br>-Anaerobic state<br>-Release of phosphorus<br>-Recirculation of sludge<br>-Same reactions as those of first intra-clarifier type oxidation ditch 1 in phase A-2 | Same as C-1 | Capable of replacing anaerobic state and facilities of PID |
| D | Inflow of raw waste water and outflow of treated water<br>-Aerobic state<br>-Decomposition organisms (Nitrification)<br>-Recirculation of sludge<br>-Same reactions as those of second intra-clarifier type oxidation ditch 2 in phase B | No-load (without inflow and outflow)<br>Aerobic state<br>-Luxury uptake of phosphorus<br>-Recirculation of sludge<br>-Same reactions as those of first intra-clarifier type oxidation ditch 1 in phase B | Inflow or raw waste water → first oxidation ditch 3 → first clarifier 4 → outflow of treated water | Phase D |

Figure 2A:
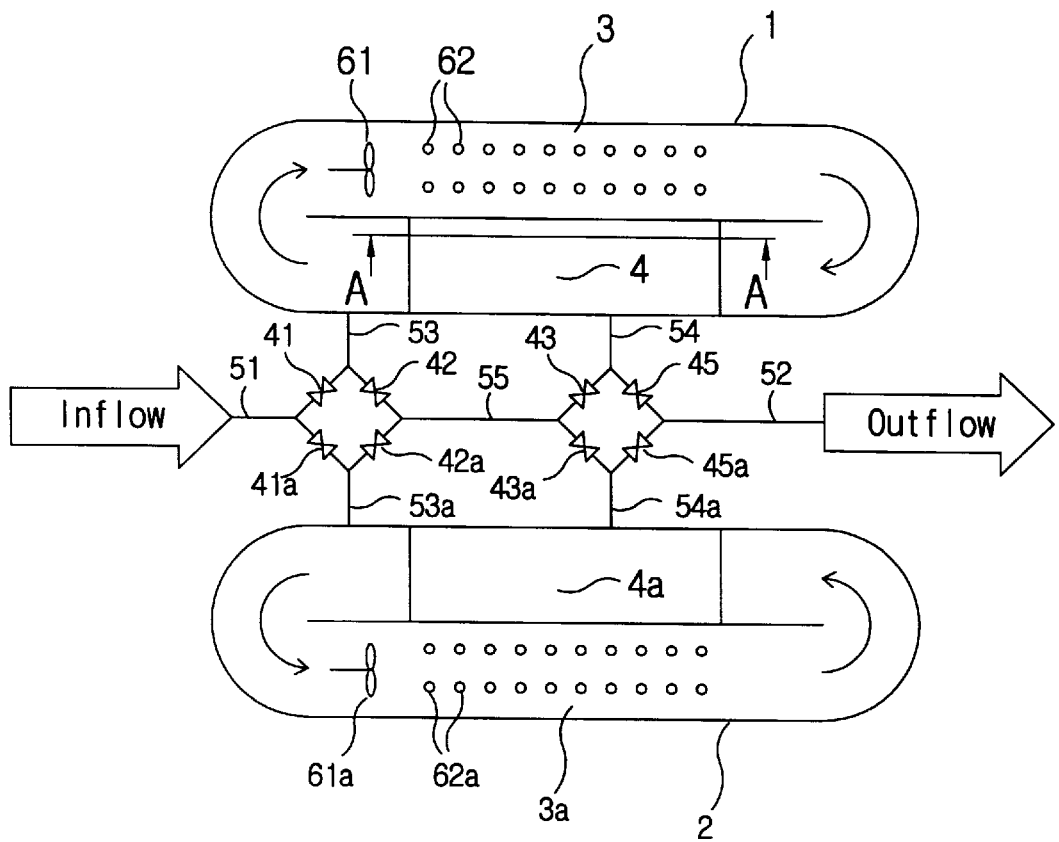
FIG. 2A is an illustration which schematically shows a first embodiment of an apparatus for removing nitrogen and phosphorus according to the present invention.

FIG. 2A illustrates an embodiment for sufficing requirement conditions for formation of flow paths by substantially constructing the flow paths required in each phase shown in FIG. 1. In more detail, unit elements including a raw waste influent path 51, a treated water outflow path 52, oxidation ditches 3 and 3a, and clarifiers 4 and 4a are connected by flow paths 53, 53a, 54 and 54a, and valves 41 through 45a are used as means for changing flow paths. The oxidation ditches 3 and 3a comprise mixers 61 and 61a and intermittent aerators 62 and 62a, respectively.

The flow path is formed so that the raw waste water is flown in into the first oxidation ditch 3 of the first intra-clarifier type oxidation ditch 1 or the second oxidation ditch 3a of the second intra-clarifier type oxidation ditch 2 via the raw waste influent path 51, and raw waste influent path regulation valves 41 and 41a are installed in the respective flow paths.

The flow paths between the unit elements are constructed so that the first oxidation ditch 3 and the second oxidation ditch 3a are connected, and the first clarifier 4 and the second clarifier 4a are connected. Flow path regulation valves, 42, 42a, 43 and 43a are installed in the respective flow paths. Also, a pipe line for connecting the first and second oxidation ditches 3 and 3a and another pipe line for connecting the first and second clarifiers 4, 4a are connected to each other to form a flow path 55 between unit elements.

The treated water outflow path 52 with treated water outflow path regulation valves 45 and 45 a is formed in each flow path branched off from the flow path between the first and second clarifiers 4 and 4a. To reduce facility costs, it is advantageous to integrate the treated water outflow path 52 into one pipe line in the following stages of the treated water outflow path regulation valves 45 and 45a.

Figure 2B:
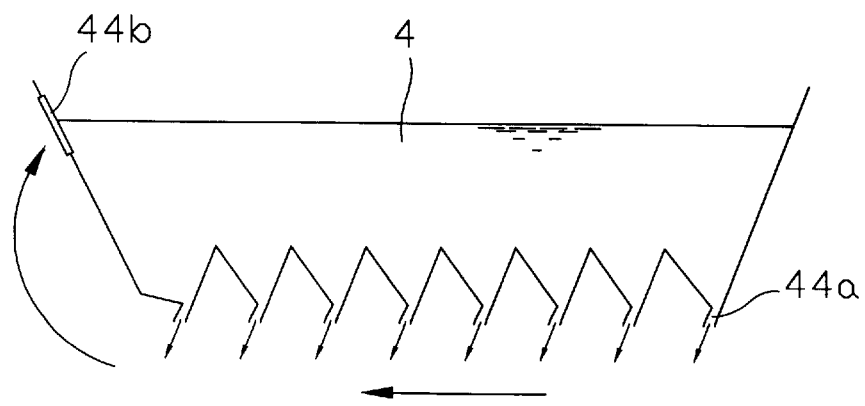
FIG. 2B is a longitudinal cross-sectional view along A—A in FIG. 2A showing an embodiment of an intra-clarifier.

FIG. 2B is a cross-sectional view of an intra-clarifier according to an embodiment of the present invention, in which a sediment outlet 44a is installed in the lower part of the first clarifier 4 and a treated water outlet 44b is provided in the upper part of one side of the first clarifier 4.

Figure 3B:
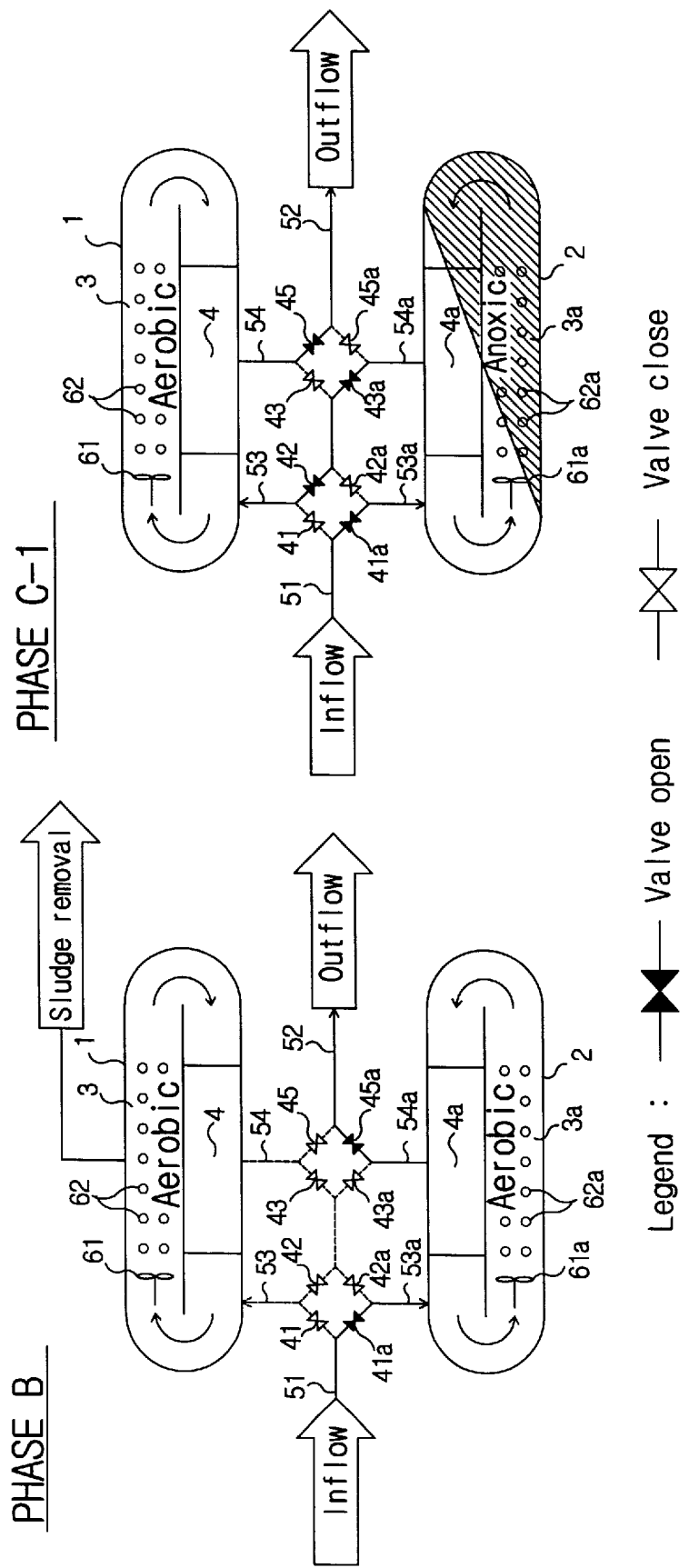
Figure 3C:
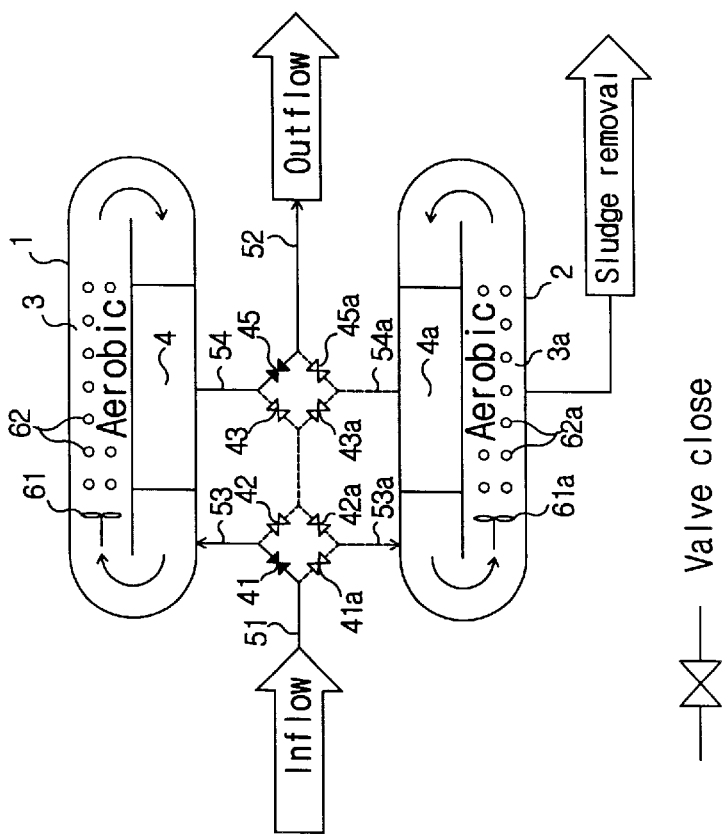

FIGS. 3A to 3C illustrate a flow path change method according to the embodiment of the present invention.

<Phases A-1 and A-2 shown in FIG. 3A>

These phases are the same as the phases A-1 and A-2 shown in FIG. 1 in which the first intra-clarifier type oxidation ditch 1 is operated in an anoxic or anaerobic state, in view of the types of reactions and processed and the sequence of flow paths.

The raw waste influent path regulation valve 41 installed in the flow path directing toward the first oxidation ditch 3 is opened and the raw waste influent path regulation valve 41 a installed in the flow path directing toward the second oxidation ditch 3a is closed so that the raw waste water is introduced only to the first oxidation ditch 3.

Then, the flow path regulation valves between unit elements are regulated so that the effluent of the first clarifier 4 is admitted into the second oxidation ditch 3a. In other words, the flow path regulation valves 42a and 43 between two unit elements are opened and those 42 and 43a between the remaining unit elements are closed. The treated water outflow path regulation valve 45 installed in the first clarifier 4 is closed so that the treated water does not flow out from the first clarifier 4, and the treated water outflow path regulation valve 45a installed in the second clarifier 4a is opened so that the treated water flows out from the second clarifier 4a.

Figure 3C:
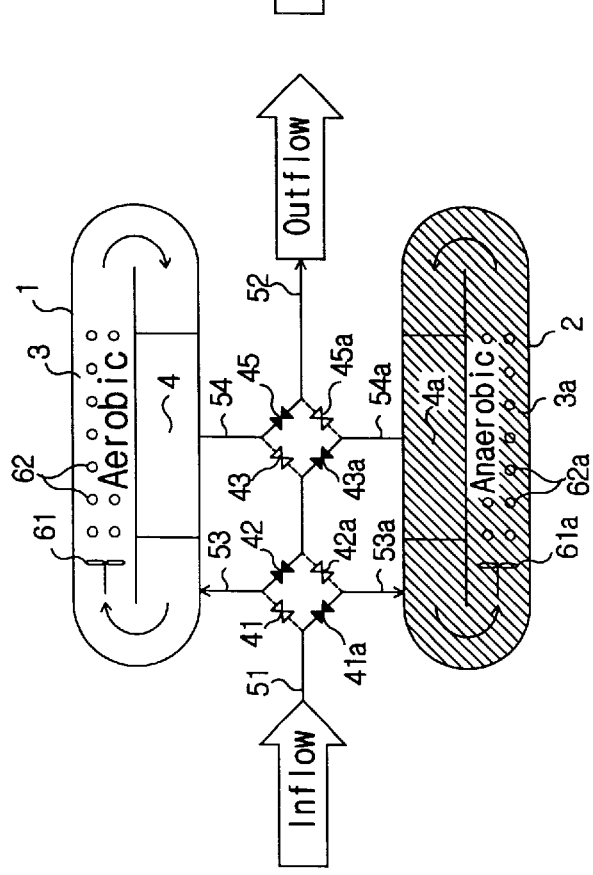

<Phase B shown in FIG. 3>

In the phase B shown in FIG. 3, the raw waste influent path regulation valve 41 of the flow path 53 entering the first oxidation ditch 3, opened in the previous phases A-1 and A-2, is closed, and the raw waste influent path regulation valve 41a of the second oxidation ditch 3a is opened so that the raw waste influent is admitted to the second intra-clarifier type oxidation ditch 2.

The flow path regulation valves 42, 42a, 43 and 43a between unit elements, for connecting the first and second oxidation ditches 3 and 3a are all closed so that the inflow and outflow are not made between the unit elements and the first oxidation ditch 3 is operated in a no-load state.

The treated water treated in the second oxidation ditch 3a in an aerobic state flows out through the treated water outflow path 52. At this time, the treated water outflow path regulation valves 45 in the side of the first clarifier 4 is closed and the treated water outflow path regulation valve 45a in the side of the second clarifier 4a is opened. In the phase B, both the first and second oxidation ditches 3 and 3a must be operated in an aerobic state. Thus, an aerator 62 of the first oxidation ditch 3 starts operating, and an aerator 62a of the second oxidation ditch 3a is continuously operated as in the previous phase.

<Phase C-1 and C-2 shown in FIG.3>

These phases are the same as the phases C-1 and C-2 shown in FIG. 1 in which the second oxidation ditch 3a is operated in an anoxic or anaerobic state, in view of the types of reactions and processes and the sequence of flow paths. The raw waste influent path regulation valve 41a of the flow path 53a directing toward the second oxidation ditch 3a is opened so that the raw waste water is admitted. The raw waste influent path regulation valve 41 installed in the flow path 53 directing toward the first oxidation ditch 3 is closed.

The flow path regulation valves 42 and 43a between two unit elements are opened so that the effluent of the second clarifier 4a is admitted into the first oxidation ditch 3, and those 42a and 43 between the remaining unit elements are closed. At this time, the treated water outflow path regulation valve 45a installed in the second clarifier 4a is closed so that the treated water of the second clarifier 4a does not flow out, and the treated water outflow path regulation valve 45 installed in the first clarifier 4 is opened so that the treated water flows out.

In the phases C-1 and C-2, the aerator 62 is continuously operated as in the previous phases so that the first oxidation ditch 3 is maintained in an aerobic state, and the aerator 62a stops operating so that the second oxidation ditch 3a is operated in an anoxic or anaerobic state.

<Phase D shown in FIG. 3>

In the phase D shown in FIG. 3, the raw waste influent path regulation valve 41a of the flow path 53a entering the second oxidation ditch 3a, opened in the previous phases C-1 and C-2, is closed, and the raw waste influent path regulation valve 41 of the first oxidation ditch 3 is opened so that the raw waste influent is admitted to the first oxidation ditch 3.

The flow path regulation valves, 42, 42a, 43 and 43a between unit elements, for connecting the first and second oxidation ditches 3 and 3a are all closed so that the second oxidation ditch 3a is operated in a no-load state without inflow of raw waste water.

The treated water outflow path regulation valve 45a installed in the side of the second clarifier 4a is closed and the treated water outflow path regulation valve 45 installed in the first clarifier 4 is opened so that the treated water treated in the first intra-clarifier type oxidation ditch 1 in an aerobic state flows out through the treated water outflow path 52.

In the phase D, since both the first and second oxidation ditches 3 and 3a must be operated in an aerobic state, the aerator 62a of the second oxidation ditch 3a starts operating, and the aerator 62 of the first oxidation ditch 3 is continuously operated as in the previous phase.

The method for regulating the valves necessary for diverting flow paths for process switching in the phases A-1 through D shown in FIGS. 3A to 3C will be summarized in the following table 2.

In this embodiment, the flow paths can be formed by a pipe line and valves or various types of open paths and gates, which is also covered under the scope of the present invention.

TABLE 2

Regulation of valves for formation of flow paths in each phase in FIGS. 3A to 3C

| Phase | Valve for regulating inflow path of raw waste water | | Valve for regulating flow path between unit elements | | | | Valve for regulating outflow path of treated water | |
|---|---|---|---|---|---|---|---|---|
| | 41 | 41a | 42 | 42a | 43 | 43a | 45 | 45a |
| A-1 and A-2 | — | H | H | — | — | H | H | — |
| B | H | — | H | H | H | H | H | — |
| C1 and C-2 | H | — | — | H | H | — | — | H |
| D | — | H | H | H | H | H | — | H |

(—: Valve open, H: Valve close)

Figure 4:
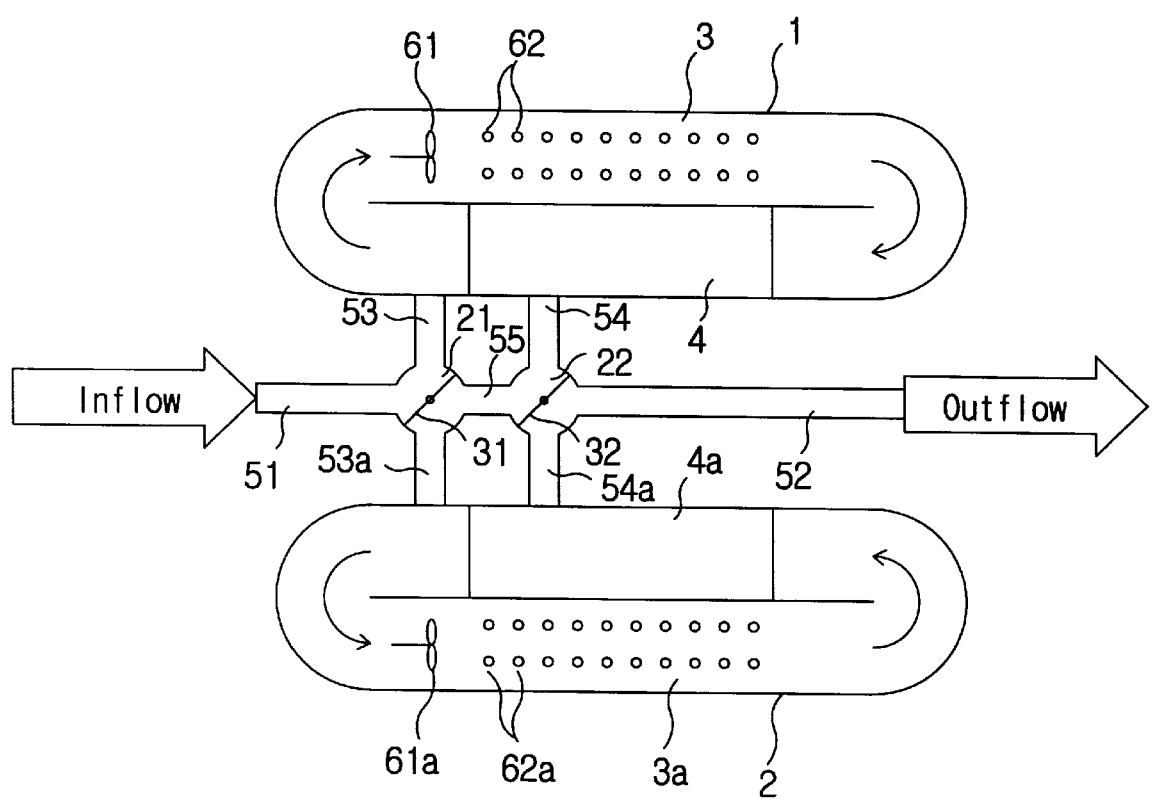
FIG. 4 is an illustration which schematically shows a second embodiment of an apparatus for removing nitrogen and phosphorus according to the present invention.

FIG. 4 is an illustration which schematically shows a second embodiment for sufficing the flow paths for implementing the respective phases of the waste water treatment method according to the present invention. In detail, flow path changing means between unit elements including inflow and outflow paths, clarifiers 4 and 4a, and oxidation ditches 3 and 3a are formed by two 4-way flow paths 21 and 22, and gates 31 and 32 are installed in the 4-way flow paths 21 and 22, respectively.

One of branches of the first 4-way flow path 21 is connected to the raw waste influent path 51 through which the raw waste water is admitted, and two branches facing each other at either side of the raw waste influent path 51 are connected to first and second oxidation ditch inflow paths 53 and 53a which are inlets of the first and second oxidation ditches 3 and 3a, respectively. The remaining branch is connected to the second 4-way flow path 22 to form a flow path 55 between unit elements.

Also, two branches of the second 4-way flow path 22 facing each other at either side of the flow path 55 between unit elements connected to the first 4-way flow path 21 are connected the first and second clarifier outflow paths 54 and 54a which are outlets of the first and second clarifiers 4 and 4a, respectively. The remaining branch of the second 4-way flow path 22 is connected to the treated water outflow path 52 through which the treated water flows out. Also, rotatable gates 31 and 32 are installed in the middle of the first and second 4-way flow paths 21 and 22 to change the flow paths while rotating by 90°.

Figure 5B:
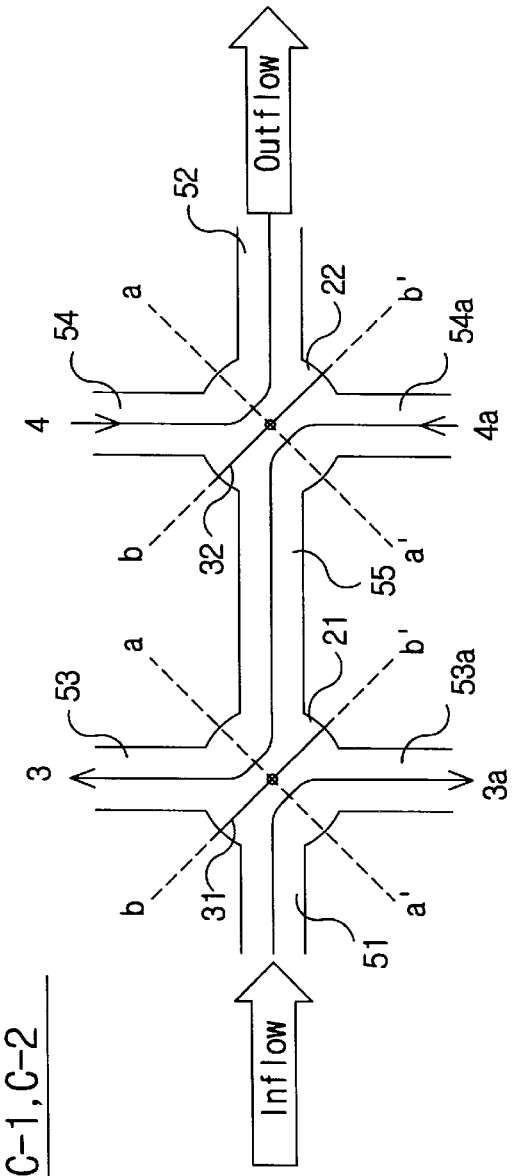

FIGS. 5A and 5B illustrate open/close states of the gates of the flow paths in the respective flow paths in the waste water treatment apparatus shown in FIG. 4, employing 4-way flow paths.

<Phases A-1 and A-2 shown in FIG. 5A>

These phases are the same as the phases A-1 and A-2 shown in FIG. 1A in which the first intra-clarifier type oxidation ditch 1 is operated in an anoxic or anaerobic state, in view of the types of reactions, processes and the sequence of flow paths. The gate 31 of the first 4-way flow path 21 is regulated in the direction aa' so that the raw waste water is admitted into the first oxidation ditch 3 through the raw waste influent path 51, the first 4-way flow path 21 and the second oxidation ditch inflow path 53a.

Since the gate 32 of the second 4-way flow path 22 is regulated in the direction of aa', the treated water of the second clarifier 4a flows out without manipulating gates separately through the second clarifier outflow path 54a, the second 4-way flow path 22 and the treated water outflow path 52.

As in the first embodiment, in the phases A-1 and A-2 of the second embodiment, the aerator 62 stops operating so that the interior of the first oxidation ditch 3 is operated in an anoxic or anaerobic state, and the aerator 62a is continuously operated so that the second oxidation ditch 3a is maintained in an aerobic state.

<Phase B shown in FIG. 5A>

The first oxidation ditch 3 is operated aerobically in a no-load state without inflow and outflow. The inflow and outflow occur only in the second oxidation ditch 3a. For switching the types of reactions and processes into those in the phase B shown in FIG. 1A, the first gate 31 is rotated by 90° from the aa' position to the bb' position.

The raw waste water is admitted along the raw waste influent path 51 to the second oxidation ditch 3a via the first 4-way flow path 21 and the second oxidation ditch inflow path 53a.

The second gate 32 is not separately regulated in the direction aa' unlike in the previous phases A-1 and A-2.

The first oxidation ditch 3 is operated in a no-load state without inflow and outflow, in a state where the first oxidation ditch inflow path 53 and the first clarifier outflow path 54 are closed by the first and second gates 31 and 32.

In this phase, since both the first and second oxidation ditches 3 and 3a must be operated aerobically, the aerator 62 of the first oxidation ditch 3 starts operating and the aerator 62a of the second oxidation ditch 3a is continuously operated as in the previous phase.

<Phases C-1 and C-2 shown in FIG. 5B>

These phases are the same as the phases C-1 and C-2 shown in FIGS. 1A and 1B in which the second oxidation ditch 3a is operated in an anoxic or anaerobic state, in view of the types of reactions and the sequence of flow paths. The gate 31 of the first 4-way flow path 21 is regulated in the direction of bb' so that the raw waste water is admitted into the second oxidation ditch 3a through the raw waste influent path 51, the first 4-way flow path 21 and the second oxidation ditch inflow path 53a.

At the same time, the gate 32 of the second 4-way flow path 22 is also regulated in the direction of bb' so that the effluent from the second clarifier 4a is admitted into the first oxidation ditch 3 through the second clarifier outflow path 54a, the second 4-way flow path 22, the flow path 55 between unit elements, the first 4-way flow path 21 and the first oxidation ditch inflow path 53. Since the gate 32 of the second 4-way flow path 22 is regulated in the direction of bb', the treated water of the first clarifier 4 flows out as treated water through the first clarifier outflow path 54 and the treated water outflow path 52.

As in the previous phase, the aerator 62 is continuously operated so that the interior of the first oxidation ditch 3 is operated in an aerobic state, and the aerator 62a stops operating so that the second oxidation ditch 3a is held in an anoxic or anaerobic state.

<Phase D shown in FIG. 5B>

In this phase, the second oxidation ditch 3a is operated aerobically in a no-load state without inflow and outflow. The inflow and outflow occur only in the first oxidation ditch 3. The first gate 31 is rotated by 90° from the bb' position to the aa' position.

The raw waste water is admitted through the raw waste influent path 51 to the first oxidation ditch 3 via the first 4-way flow path 21 and the first oxidation ditch inflow path 53.

The second gate 32 is not separately regulated in the bb' position. The effluent from the first clarifier 4 flows out as treated water through the first clarifier outflow path 54, the second 4-way flow path 22 and the treated water through the first clarifier outflow path 54, the ditch 3a is operated aerobically as the aerator 62a starts operating without inflow and outflow, in a state where the second oxidation ditch inflow path 53a and the second clarifier outflow path 54a are closed by the first and second gates 31 and 32. The aerator 62 of the first oxidation ditch 3 is continuously operated as in the previous phase.

The method for regulating gates necessary for changing flow paths required in the phases A-1 through D shown in FIGS. 5A and 5B will be summarized in the following table 3.

TABLE 3

Figure 5B:
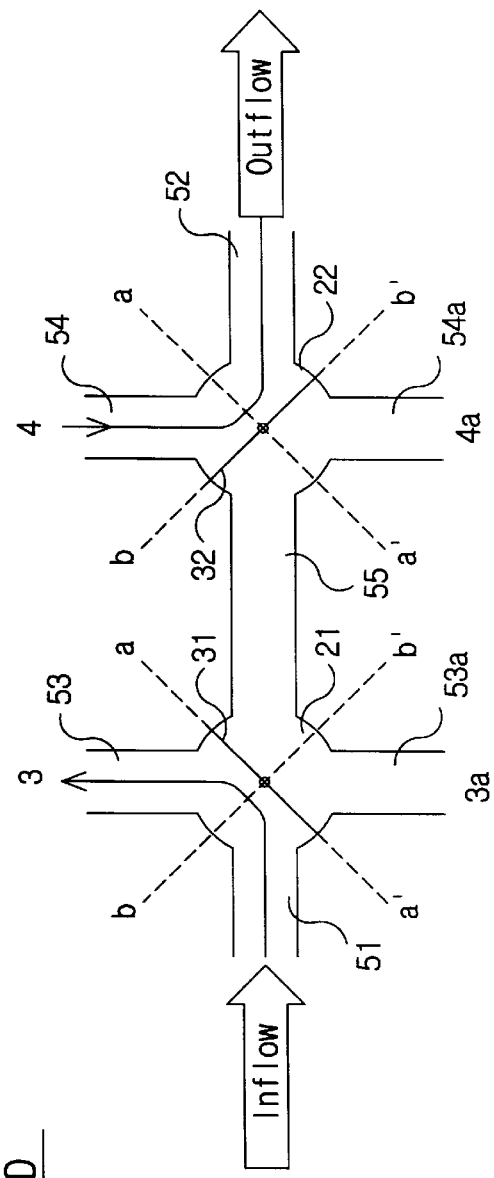

Regulation of gates for formulation of flow paths in each phase in FIG. 5

| Phase | Position of first gate 31 in the first 4-way flow path 21 | Position of second gate 32 in the second 4-way flow path 22 |
| --- | --- | --- |
| A-1 and A-2 | aa' | aa' |
| B | bb' | aa' |
| C-1 and C-2 | bb' | bb' |
| D | aa' | bb' |

In this embodiment, the flow paths can be formed by open paths and gates or various types of pipe lines and valves, which is also covered under the scope of the present invention.

Figure 6:
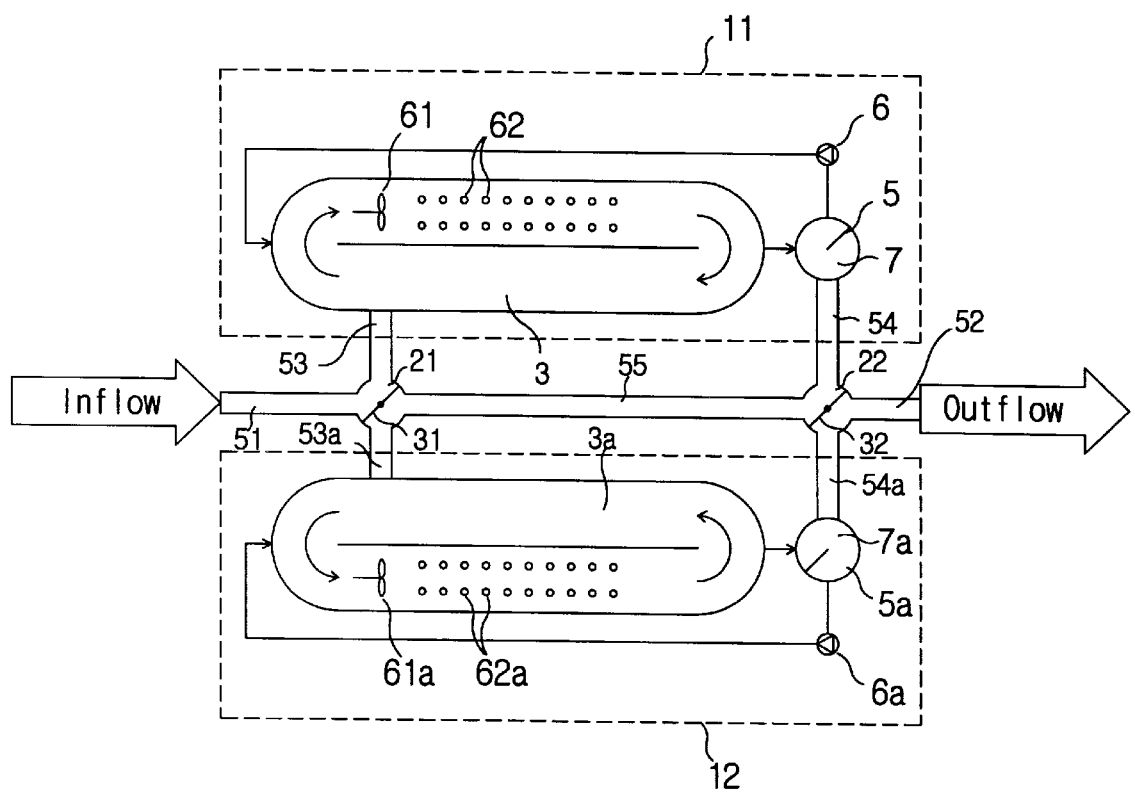
FIG. 6 is an illustration which schematically shows a third embodiment of an apparatus for removing nitrogen and phosphorus according to the present invention.

FIG. 6 is an illustration which schematically shows a third embodiment of an apparatus for removing nitrogen and phosphorus by flow path change and intermittent aeration according to the present invention, which is the same as FIG. 4, with the exception of the types of clarifiers being changed into external clarifier 7 and 7a in view of apparatus configuration, and is the same as FIGS. 5A and 5B in view of the operation method and kinds of reactions.

FIG. 6 illustrates a third embodiment of the apparatus constructed by combining external-clarifier type oxidation ditches 11 and 12 with 4-way flow paths 21 and 22 using unit systems constituting the apparatus and flow path change. Equipment for flow path change and intermittent aeration are additionally installed to the conventionally existing external-clarifier type oxidation ditches 11 and 12 or activates sludge process for removing organisms, thereby attaining an equipment for removing nitrogen and phosphorus easily. The external-clarifier type oxidation ditches 11 and 12 are equipped with clarifiers 7 and 7a, sludge collectors 5 and 5a, and sludge return pumps 6 and 6a in the outside of oxidation ditches 3 and 3a.

As described above, in the waste water treatment plant for removing nitrogen and phosphorus according to the present invention, the nitrogen and phosphorus removal efficiency is improved and is held at a stable level. Also, the eutrophication of rivers or lakes, which is a widespread serious problem, can be reduced. Also, when compared with the conventional PID process shown in FIGS. 7A and 7B, a system for removing nitrogen and phosphorus having following advantages can be provided.

First, the efficiency of removing nutrient salts is excellent and stable.

Second, the switching of phases for nitrification and denitrification and release and luxury uptake of phosphorus are fast and the reaction time is reduced.

Third, since the preliminary denitrification basin 201 the selection basin 201b and the anaerobic basin 201c are not necessary, and an oxidation ditch and a clarifier are intraly formed, the utilization efficiency of sites is enhanced and the construction costs can be reduced.

Fourth, since the mixer 301 installed in the preliminary denitrification basin, the sludge collector 206 of the clarifier and the returned sludge pump 205 are not necessarily installed, the system is very economical, in view of installation costs incurred by electrical instrumentation work accompanying a mechanical work.

Fifth, due to a simple process, maintenance and management costs including the driving power and manpower are reduced.

Sixth, since intra-clarifier type oxidation ditches are used, loss in water head is less than that in the PID process, thereby reducing the pumping head loss of an inflow pumping field.

Seventh, since intra-clarifier type oxidation ditches are used, while the oxidation ditches are maintained in an aerobic state, the clarifiers are also kept in an aerobic state. Thus, the lowering in the quality of treated water due to sludge rising in the clarifiers or release of phosphorus can be avoided.

What is claimed is:

1. A waste water treatment plant for removing nitrogen and phosphorus comprising:

at least a pair of intra-clarifier type oxidation ditches, each of which has an oxidation ditch equipped with aeration means operated intermittently for supplying dissolved oxygen into water and mixing means for mixing hydrosoma, and a clarifier incorporated into the oxidation ditch, said pair of intra-clarifier type oxidation ditches contracted so that sludge can not be moved therebetween;

a pair of oxidation ditch inflow paths, each of which in connected to the respective oxidation ditches;

a pair of clarifier outflow paths, each of which is connected to the respective clarifiers;

a raw waste influent path for feeding raw waste water into the respective oxidation ditches;

a treated water outflow path for discharging treated water from the respective clarifiers; and connection means for connecting the raw waste influent path to the pair of oxidation ditch inflow paths, the pair of clarifier outflow paths to the treated water outflow path and the pair of oxidation ditch inflow paths to the pair of clarifier outflow paths, and for regulating the paths to change the flow of the raw waste water according to respective treatment phases.

2. A waste water treatment plant for removing nitrogen and phosphorus, comprising:

a pair of oxidation ditches, each of which is equipped with aeration means operated intermittently for supplying dissolved oxygen into water and mixing means for mixing hydrosoma;

a pair of clarifiers, each of which is connected to the respective oxidation ditches;

a pair of sludge collectors, each of which is combined the respective clarifiers;

a pair of sludge return pumps for returning collected sludge in the respective sludge collectors to the respective oxidation ditches therethrough;

a pair of oxidation ditch inflow paths, each of which is connected to the respective oxidation ditches;

a pair of clarifier outflow paths, each of which is connected to the respective clarifiers;

a raw waste influent path for feeding raw waste water into the respective oxidation ditches;

a treated water outflow path for discharging treated water from the respective clarifiers; and connection means for connecting the raw waste influent path to the pair of oxidation ditch inflow paths, the pair of clarifier outflow paths to the treated water outflow path and the pair of oxidation ditch inflow paths to the pair of clarifier outflow paths, and for regulating the paths to change the flow of the raw waste water according to respective treatment phases.

3. The waste water treatment plant according to claim 1, wherein the connection means comprises:

eight connection paths, two of which connect the raw waste influent path to the pair of oxidation ditch inflow paths, two of which connect the pair of clarifier outflow paths to the treated water outflow path, two of which connect the pair of oxidation ditch inflow paths to each other, and two of which connect the pair of clarifier outflow paths to each other;

a flow path for connecting a connection point between the pair of oxidation ditch inflow paths to a connection point between the pair of clarifier outflow paths; and eight valves installed in the respective connection paths for regulating the connection paths to change the flow fo the raw waste water according to respective treatment phases.

4. The waste water treatment plant for removing nitrogen and phosphorus according to claim 1, wherein the connection means comprises:

a pair of 4-way flow paths, one of which connects the raw waste influent path to the pair of oxidation ditch inflow paths, and the other of which connects the pair of clarifier outflow paths to the treated water outflow path;

a flow path for connecting between the pair of 4- way flow paths; and a pair of gates installed in respective centers of the pair of 4-way flow paths for regulating the 4-way flow paths while rotating by 90° to change the flow of the raw waste water according to respective treatment phases.

5. The waste water treatment plant of removing nitrogen and phosphorus according to claim 1, wherein the pair of intra-clarifier type oxidation ditches further comprise means for controlling the aeration means to be operated intermittently, respectively.

6. The waste water treatment plant for removing nitrogen and phosphorus according to claim 4, wherein the connection means further comprise means for controlling the gates to be automatically opened/closed according to the respective treatment phases.

* * * * *